United States Patent Office 3,042,660
Patented July 3, 1962

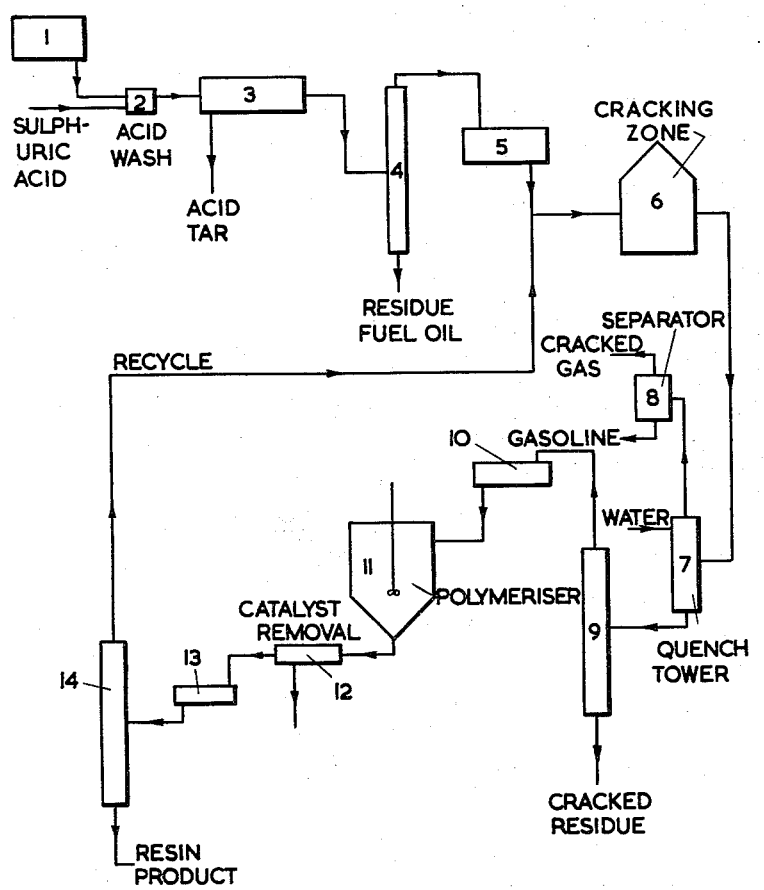

3,042,660
PRODUCTION OF RESINS FROM PETROLEUM HYDROCARBONS
John Habeshaw, Dollar, and Robin William Rae, Falkirk, Scotland, assignors to British Hydrocarbon Chemicals Limited, Piccadilly, London, England, a British company
Filed June 5, 1958, Ser. No. 740,061
Claims priority, application Great Britain June 21, 1957
5 Claims. (Cl. 260—82)

The present invention relates to the production of resins from hydrocarbon pyrolysis products.

It is well known that resins are formed by the polymerisation of fractions of the pyrolysis products of hydrocarbons derived, for instance, from petroleum. However, hitherto it has usually only been possible to polymerise a small proportion of the cracked products to resins of satisfactory quality, so that the resin yield is at the most only a small percentage of the feed to the cracking step. Furthermore, the quality of the resin produced is usually dependent on the feedstock to the cracking process and on the cracking conditions, making control of resin quality difficult or impossible, in such processes where resins are relatively minor by-products, particularly as the reasons for variation in resin quality are only imperfectly understood.

It is an object of the present invention to provide an improved process for the production of resins from petroleum hydrocarbon pyrolysis products. The present process uses a feedstock and cracking conditions which give high yields of the resin forming fraction compared with previous processes. This enables resins to be produced as a primary product by an economically feasible process, in which the cracking and polymerisation conditions can be adequately controlled to produce resins of the required quality and with constant properties. The process uses feedstocks available in ample quantity at low cost and can be used to produce resins of high quality, particularly with regard to softening point and colour.

According to the present invention, the process for the production of resins from petroleum hydrocarbon pyrolysis products comprises thermally cracking at a temperature between 600° and 800° C. a catalytically cracked petroleum fraction boiling in the range 150° C. to 300° C., separating from the thermally cracked products a fraction boiling in the range 150–300° C., and polymerising the latter fraction in the presence of a Friedel-Crafts catalyst.

The starting materials for the process of the invention are catalytically cracked petroleum fractions boiling between 150° and 300° C., and preferably between 200° and 300° C., at atmospheric pressure. The catalytic cracking process is well known and is described, for example in "The Chemistry of Petroleum Hydrocarbons," Reinhold Publishing Corporation, 1955, vol. II, pp. 137–188. Particularly suitable starting materials are the bottoms from the re-running of catalytically cracked gasoline, and the lower boiling fractions of catalytically cracked gas oil. Such feedstocks can generally be produced to fall within the desired boiling point range on the catalytic cracker fractionating system, but a re-running or redistillation may sometimes be necessary. In a preferred embodiment the feedstock is subjected to an acid refining treatment with sulphuric acid or oleum followed by re-running, such treatment resulting in the production of paler coloured resins from a given feedstock than would otherwise be the case. Suitably the feedstock is treated with 1% by weight of sulphuric acid or oleum, and is then redistilled discarding up to about 5 to 10% of the fraction as residue.

The thermal cracking step is carried out in the conventional manner by heating the petroleum fraction in the vapour phase at temperatures between 600° and 800° C., preferably in the presence of steam or other inert diluent. In general the use of the higher cracking temperatures within this range gives higher yields of resins of higher softening point and somewhat better colour. Below about 600° C. the resin yield becomes too low to be of practical interest. It is preferred to use cracking temperatures between about 650° and 750° C., the lower temperatures in this range being suitable for cracking in the absence of a diluent, while the higher temperatures in the range are preferred when a diluent such as steam is used. The yield of resin is generally higher when the cracking step is carried out in the presence of steam or other diluent, and as in conventional steam cracking processes the use of steam assists in preventing coking and side reactions of the cracked products. Amounts of steam ranging from 0.1 to 10 moles per mole of hydrocarbon cracked are suitable. In the cracking step the hydrocarbon feed is suitably led into a preheater where the liquid is vaporised at an elevated temperature which is preferably below that of the cracking section. The inert diluent is preferably separately preheated, the combined streams entering the cracking zone. The residence time in the cracking zone is not critical and values in the range of about 0.1 to 10 seconds, and preferably about 1 second, may be used. In general the longer residence times are required at lower cracking temperatures.

The products from the thermal cracking step are treated to separate a fraction boiling between 150° and 300° C. for the polymerisation step. Suitably the cracked products are first quenched, for instance by injection of water or oil into the exit stream from the cracking zone, and after further cooling, the gaseous products of cracking, which consist mainly of hydrogen, methane, ethane, ethylene and propylene with a lesser amount of propane, and higher hydrocarbons are separated. The condensed liquid is then distilled to separate a fraction boiling up to an end point of about 150° C., the main resin forming fraction boiling from 150° to 300° C., and a small amount of residue.

The resin forming fraction is then polymerised in the conventional manner in the presence of a Friedel-Crafts catalyst. Suitable catalysts include aluminium chloride, stannic chloride and boron trifluoride, either free or in the form of their complexes. Aluminium chloride may be used as a finely divided solid, or as a liquid complex with aromatic hydrocarbons, such as xylene. These complexes are readily made by stirring solid aluminium chloride with the aromatic hydrocarbon, the complex forming rapidly on warming to about 80° C., in the case of xylene, and separating as a dark coloured dense layer which may be separated from the clear supernatant liquid. Solid aluminium chloride may be added to the liquid complex so formed to enhance or maintain its catalytic activity. It is preferred to use boron trifluoride or its complexes with, for instance, diethyl ether, acetic acid or phenol in an amount in the range 0.01 to 1% by weight of the feed to the polymerisation.

The polymerisation may be carried out batchwise or continuously, and agitation to ensure adequate mixing of catalyst and hydrocarbon is desirable. The reaction may be carried out at a temperature in the range −50° to 150° C. Since the reaction is exothermic it is desirable to provide means for control of the temperature and for the removal of the heat of reaction. The reaction time is not critical, and times of up to six hours have been found suitable. If desired, the polymerisation can be carried out in the presence of an added solvent such as an inert hydrocarbon, or other unreactive material.

After the polymerisation, the product is treated to remove the catalyst, and is then washed with alkali, for instance a dilute aqueous sodium carbonate solution, to remove the last traces of acidic material. The resinous product can then be recovered by distilling off the hydrocarbon boiling up to about 300° C., which can be recovered as a by-product or preferably recycled to the cracking step, leaving the resin product as residue. The resin may be stripped to the required softening point by vacuum stripping or by steam or inert gas stripping.

The present invention is further illustrated with reference to the accompanying drawing which is a flow diagram of one embodiment of the present invention.

Referring to the drawing, a catalytically cracked petroleum fraction boiling in the range 150° to 300° C. is taken from storage in 1 and acid wash in 2 with 98% sulphuric acid. Acid tar is removed as a residue in the tank 3, and the acid-washed concentrate is distilled in the column 4 to leave 5% by weight as residue (fuel oil). The acid washed and distilled feed is stored in 5, from where it is passed, together with a recycle stream from column 14, to the thermal cracking zone 6. The effluent from the cracking zone is quenched with water in the tower 7, and low-boiling (up to about 150° C.) products and gas are allowed to pass overhead into the separator 8, where products are withdrawn as cracked gas and gasoline. The residue from the quench tower passes to the column 9, where the 150°–300° C. fraction is taken overhead to storage 10. The residue over 300° C. from the column 9 is a pitch-like product. Alternative methods of quenching, for example with oil fractions, and of working up the products can obviously be employed as in other known steam cracking processes.

The 150–300° C. fraction of the pyrolysed product is polymerised batchwise in the polymeriser 11, and the polymerised product is treated for the removal of catalyst in 12, the catalyst-free product being stored in 13. From 13 the polymerised product passes to the column 14, in which the 150–300° C. fraction is removed as distillate and recycled to the pyrolysis.

The resin is recovered from column 14 as the residue boiling over 300° C./760 mm.

EXAMPLE

The invention is illustrated by the following non-limitative example:

A catalytically cracked petroleum fraction derived from a Middle East crude, and having a boiling range of 212° to 262° C., was washed three times with successive 1 wt. percent amounts of 98% sulphuric acid. Each wash lasted one hour and was carried out at room temperature. After removal of residual traces of acid from the washed product, it was distilled to leave a 5 wt. percent residue and the distillate was used as feedstock for runs 11 and 12. In these runs cracking was carried out in a coil in the presence of 4.5 moles steam per mole of hydrocarbon at a temperature of 668° C., at atmospheric pressure, and at a hydrocarbon feed rate of 0.67 liquid volumes per volume of reactor per hour. From the combined cracked products of runs 11 and 12 a fraction of boiling range 150°–300° C. was isolated and a resin was prepared from this by polymerisation in a stirred batch reactor with 0.4% by weight of a boron trifluoride-diethyl ether complex at 60° C. for 2 hours. The polymerised products were washed first with 15% aqueous sodium carbonate solution and then with water, and dried. The resin was recovered by distilling off the unreacted hydrocarbon to an overhead temperature equivalent to 300° C./760 mm. The resin was evaluated by testing for bromine number by the method described by Kaufmann and Barich (Arch. Pharm. 267, 1–26 (1929)), for softening point by the ring and ball method, I.P. 58/56, and for color using the Barratt scale. The results are given in the table, runs 11 and 12.

The recovered unpolymerised fraction boiling between 150 and 300° C. from runs 11 and 12 was further cracked in run 14 under the same conditions used in runs 11 and 12 and a further quantity of resin prepared as before from the 150–300° C. fraction of the cracked product. The results for run 13 are also shown in the table.

Table

|  | Run | | Cumulative Yield, wt. Percent of feed to Runs 11 and 12 |
|---|---|---|---|
|  | 11 and 12 | 13 |  |
| Pyrolysis Products, wt. percent of feed to Run: | | | |
| Uncondensed gas | 21 | 11 | 26 |
| Liquid boiling below 150° C | 10 | 8 | 14 |
| Liquid boiling 150–300° C | 61 | 75 | |
| Residue boiling over 300° C | 8 | 6 | 11 |
| Polymerisation Products, wt. percent of feed to pyrolysis: | | | |
| Recovered hydrocarbon, 150–300° C | 46 | 64 | 29 |
| Resin over 300° C | 15 | 11 | 20 |
| Resin over 300° C., wt. percent of feed to polymerisation step | 24 | 14 | |
| Resin properties: | | | |
| Softening point, ° C | 137 | 128 | |
| Bromine No | 21 | 24 | |
| Colour (Barratt Scale) | 3.5 | 3.5 | |

We claim:

1. The process for the production of resins from petroleum hydrocarbon pyrolysis products which comprises thermally cracking in the presence of steam at a temperature between 600° and 800° C. and for 0.1 to 10 seconds a catalytically cracked petroleum fraction boiling in the range 212° to 262° C., the catalytically cracked petroleum fraction having been subjected to an acid-refining treatment with sulphuric acid, followed by redistillation to discard between 5% and 10% of the fraction as residue, cooling the thermally cracked products and distilling to separate a fraction boiling in the range 150° to 300° C., polymerising the latter fraction in the presence of between 0.01 and 1% by weight of a Friedel-Crafts catalyst selected from the group consisting of aluminum chloride, stannic chloride, boron trifluoride and their complexes, separating by distillation the resinous product from the hydrocarbon boiling up to about 300° C., and recycling this hydrocarbon to the cracking step.

2. The process as claimed in claim 1 wherein the catalytically cracked petroleum fraction comprises residues from the redistillation of catalytically cracked gasoline.

3. The process as claimed in claim 1 wherein the catalytically cracked petroleum fraction comprises lower boiling fractions of catalytically cracked gas oil.

4. The process as claimed in claim 1 wherein the polymerisation catalyst is a complex of aluminium chloride with an aromatic hydrocarbon.

5. The process as claimed in claim 1 wherein the polymerisation catalyst is a complex of boron trifluoride with a compound selected from the group consisting of diethyl ether, acetic acid, and phenol.

References Cited in the file of this patent

UNITED STATES PATENTS

| 1,309,432 | Brownlee | July 8, 1919 |
| 1,409,590 | Salathe | Mar. 14, 1922 |
| 2,084,012 | Thomas | June 15, 1937 |
| 2,159,220 | McNulty et al. | May 23, 1939 |
| 2,758,988 | Banes et al. | Aug. 14, 1956 |
| 2,824,860 | Aldridge et al. | Feb. 25, 1958 |
| 2,828,293 | Leary | Mar. 25, 1958 |